United States Patent
Barriac et al.

(10) Patent No.: US 9,445,345 B2
(45) Date of Patent: Sep. 13, 2016

(54) STAGGERED PRIMARY CHANNEL SELECTION IN WIFI COMMUNICATION SYSTEMS

(71) Applicant: QUALCOMM Incorporated, San Diego, CA (US)

(72) Inventors: Gwendolyn Denise Barriac, Encinitas, CA (US); Simone Merlin, Solana Beach, CA (US); Yan Zhou, San Diego, CA (US); Hemanth Sampath, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 27 days.

(21) Appl. No.: 14/486,946

(22) Filed: Sep. 15, 2014

(65) Prior Publication Data
US 2015/0078298 A1 Mar. 19, 2015

Related U.S. Application Data

(60) Provisional application No. 61/879,117, filed on Sep. 17, 2013.

(51) Int. Cl.
| | |
|---|---|
| *H04W 4/00* | (2009.01) |
| *H04W 40/02* | (2009.01) |
| *H04W 4/12* | (2009.01) |
| *H04W 48/00* | (2009.01) |
| *H04W 84/12* | (2009.01) |
| *H04W 92/20* | (2009.01) |

(52) U.S. Cl.
CPC ............. *H04W 40/02* (2013.01); *H04W 4/12* (2013.01); *H04W 48/17* (2013.01); *H04W 84/12* (2013.01); *H04W 92/20* (2013.01)

(58) Field of Classification Search
CPC ...... H04W 40/02; H04W 4/12; H04W 48/17; H04W 92/20
See application file for complete search history.

(56) References Cited

U.S. PATENT DOCUMENTS

| | | | |
|---|---|---|---|
| 2008/0268858 A1 | 10/2008 | Wu et al. | |
| 2012/0052900 A1* | 3/2012 | Liu | H04W 28/0205 455/515 |
| 2012/0057534 A1* | 3/2012 | Park | H04W 72/082 370/329 |
| 2012/0213204 A1* | 8/2012 | Noh | H04W 72/02 370/331 |
| 2014/0003353 A1* | 1/2014 | Stephens | H04W 72/0453 370/329 |
| 2014/0304383 A1* | 10/2014 | Guo | H04L 41/12 709/223 |

OTHER PUBLICATIONS

International Search Report and Written Opinion—PCT/US2014/055792—ISA/EPO—Jan. 19, 2015.

* cited by examiner

*Primary Examiner* — Abdelnabi Musa
(74) *Attorney, Agent, or Firm* — Patterson & Sheridan, L.L.P.

(57) ABSTRACT

Certain aspects of the present disclosure relate generally to wireless communications, and more specifically to systems, methods, and devices for staggered primary channel selection for WiFi. According to certain aspects, a method for wireless communications is provided. The method may be performed, for example, by an access point (AP). The method generally includes obtaining information regarding neighbor basic service sets (BSSs), selecting a primary channel based on the obtained information, and output for transmission a message signaling an intention to communicate using the selected primary channel.

25 Claims, 7 Drawing Sheets

STAGGERED PRIMARY CHANNEL SELECTION IN WIFI COMMUNICATION SYSTEMS

CROSS-REFERENCE TO RELATED APPLICATION(S)

This application claims benefit of U.S. Provisional Patent Application Ser. No. 61/879,117, filed Sep. 17, 2013, which is herein incorporated by reference in its entirety.

BACKGROUND

I. Field of the Disclosure

The present application relates generally to wireless communications, and more specifically, to systems, methods, and devices for primary channel selection in wireless systems.

II. Description of Related Art

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

However, multiple wireless networks may exist in the same building, in nearby buildings, and/or in the same outdoor area. The prevalence of multiple wireless networks may cause interference, reduced throughput (e.g., because each wireless network is operating in the same area and/or spectrum), and/or prevent certain devices from communicating. Thus, improved systems, methods, and devices for communicating when wireless networks are densely populated are desired.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure generally relate to systems, methods, and devices for primary channel selection in wireless systems.

Certain aspects of the present disclosure provide an apparatus for wireless communications. The apparatus generally includes a processing system configured to select a primary channel based on information regarding neighbor basic service sets (BSSs) and to generate a message signaling an intention to communicate using the selected primary channel, and an interface configured to output the message for transmission.

Certain aspects of the present disclosure provide a method for wireless communications. The method may be performed, for example, by an access point (AP). The method generally includes obtaining information regarding neighbor basic service sets (BSSs), selecting a primary channel based on the obtained information, and outputting for transmission a message signaling an intention to communicate using the selected primary channel.

Certain aspects of the present disclosure provide an apparatus for wireless communications. The apparatus generally includes means for obtaining information regarding neighbor BSSs), means for selecting a primary channel based on the obtained information, and means for outputting for transmission a message signaling an intention to communicate using the selected primary channel.

Certain aspects of the present disclosure provide a computer program product. The computer program product generally includes a computer-readable medium having instructions stored thereon, the instructions executable by an apparatus for obtaining information regarding neighbor basic service sets (BSSs), selecting a primary channel based on the obtained information, and outputting for transmission a message signaling an intention to communicate using the selected primary channel.

Certain aspects of the present disclosure provide an access point (AP). The access point (AP) generally includes at least one antenna, a processing system configured to select a primary channel based on information regarding neighbor basic service sets (BSSs) and generate a message signaling an intention to communicate using the selected primary channel, and a transmitter configured to transmit the message via the least one antenna.

Numerous other aspects are provided including methods, apparatus, systems, computer program products, and processing systems.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
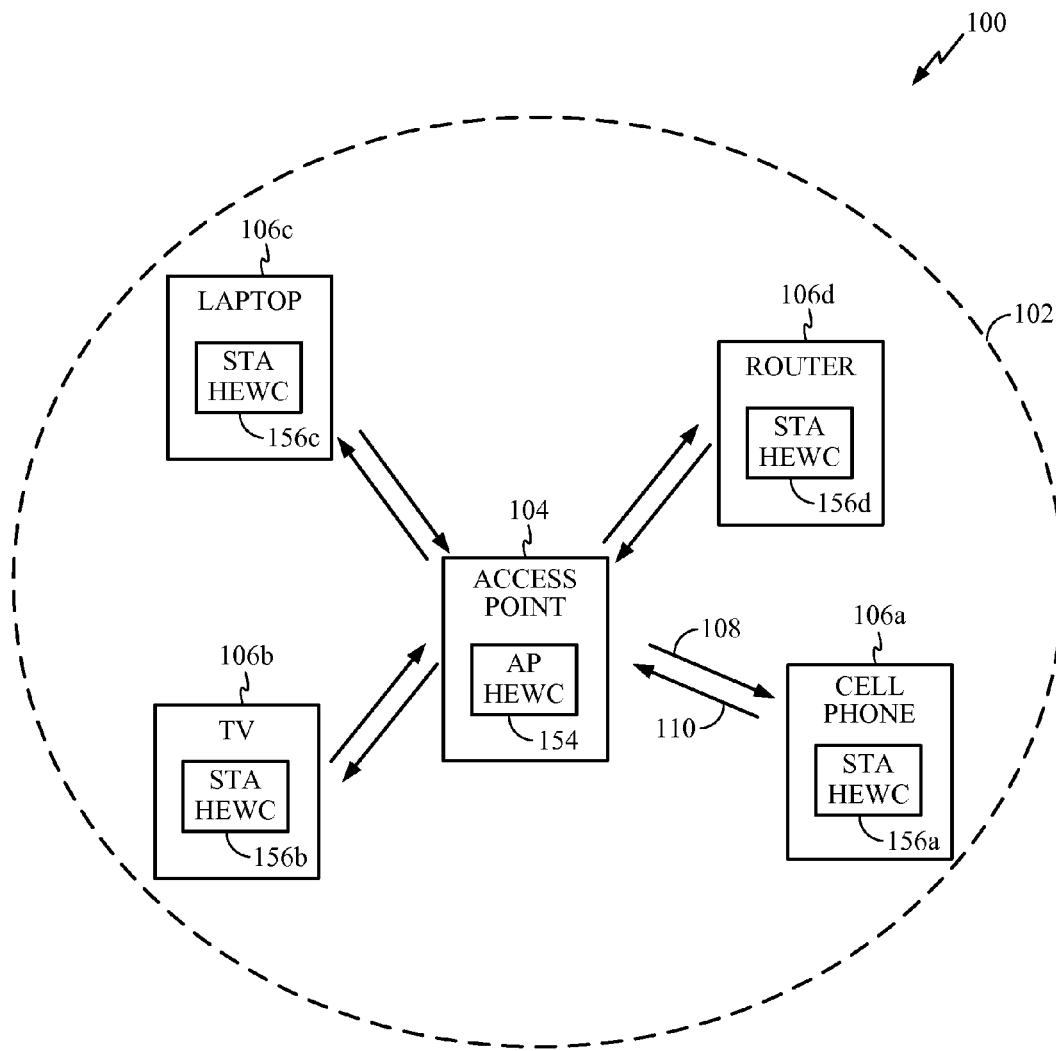
FIG. 1 shows an exemplary wireless communication system in which aspects of the present disclosure may be employed.

Certain aspects of the present disclosure generally relate to systems, methods, and devices for primary channel selection in wireless systems. A primary channel may be selected based on information at the access point (AP) or based on additional information received from neighbor APs. The selection of the primary channel may be uncoordinated or may be coordinated with neighbor APs. A Channel Switch Announcement Protocol may not include sending a Wide Bandwidth element.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some aspects, wireless signals may be transmitted according to a high-efficiency 802.11 protocol using orthogonal frequency-division multiplexing (OFDM), direct-sequence spread spectrum (DSSS) communications, a combination of OFDM and DSSS communications, or other schemes. Implementations of the high-efficiency 802.11 protocol may be used for Internet access, sensors, metering, smart grid networks, or other wireless applications. Advantageously, aspects of certain devices implementing the high-efficiency 802.11 protocol using the techniques disclosed herein may include allowing for increased peer-to-peer services (e.g., Miracast, WiFi Direct Services, Social WiFi, etc.) in the same area, supporting increased per-user minimum throughput requirements, supporting more users, providing improved outdoor coverage and robustness, and/or consuming less power than devices implementing other wireless protocols.

In some implementations, a WLAN includes various devices which are the components that access the wireless network. For example, there may be two types of devices: access points ("APs") and clients (also referred to as stations, or "STAs"). In general, an AP may serve as a hub or base station for the WLAN and an STA serves as a user of the WLAN. For example, an STA may be a laptop computer, a personal digital assistant (PDA), a mobile phone, etc. In an example, an STA connects to an AP via a WiFi (e.g., IEEE 802.11 protocol) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement a high-efficiency 802.11 standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

Example Wireless Communications Systems

FIG. 1 shows an exemplary wireless communication system 100 in which aspects of the present disclosure may be employed. The wireless communication system 100 may operate pursuant to a wireless standard, for example a high-efficiency 802.11 standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with code division multiple access (CDMA) techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP, but rather may function as a peer-to-peer network between the STAs 106. Accordingly, the functions of the AP 104 described herein may alternatively be performed by one or more of the STAs 106.

In some aspects, a STA 106 may be required to associate with the AP 104 in order to send communications to and/or receive communications from the AP 104. In one aspect, information for associating is included in a broadcast by the AP 104. To receive such a broadcast, the STA 106 may, for example, perform a broad coverage search over a coverage region. A search may also be performed by the STA 106 by sweeping a coverage region in a lighthouse fashion, for example. After receiving the information for associating, the STA 106 may transmit a reference signal, such as an association probe or request, to the AP 104. In some aspects, the AP 104 may use backhaul services, for example, to communicate with a larger network, such as the Internet or a public switched telephone network (PSTN).

In an embodiment, the AP 104 includes an AP high-efficiency wireless component (HEWC) 154. The AP HEWC 154 may perform some or all of the operations described herein to enable communications between the AP 104 and the STAs 106 using the high-efficiency 802.11 protocol. The functionality of the AP HEWC 154 is described in greater detail below with respect to FIGS. 2B, 3, 4, and 5.

Alternatively or in addition, the STAs 106 may include a STA HEWC 156. The STA HEWC 156 may perform some or all of the operations described herein to enable communications between the STAs 106 and the AP 104 using the high-frequency 802.11 protocol. The functionality of the STA HEWC 156 is described in greater detail below with respect to FIGS. 2B, 3, 4, and 5.

Figure 2A:
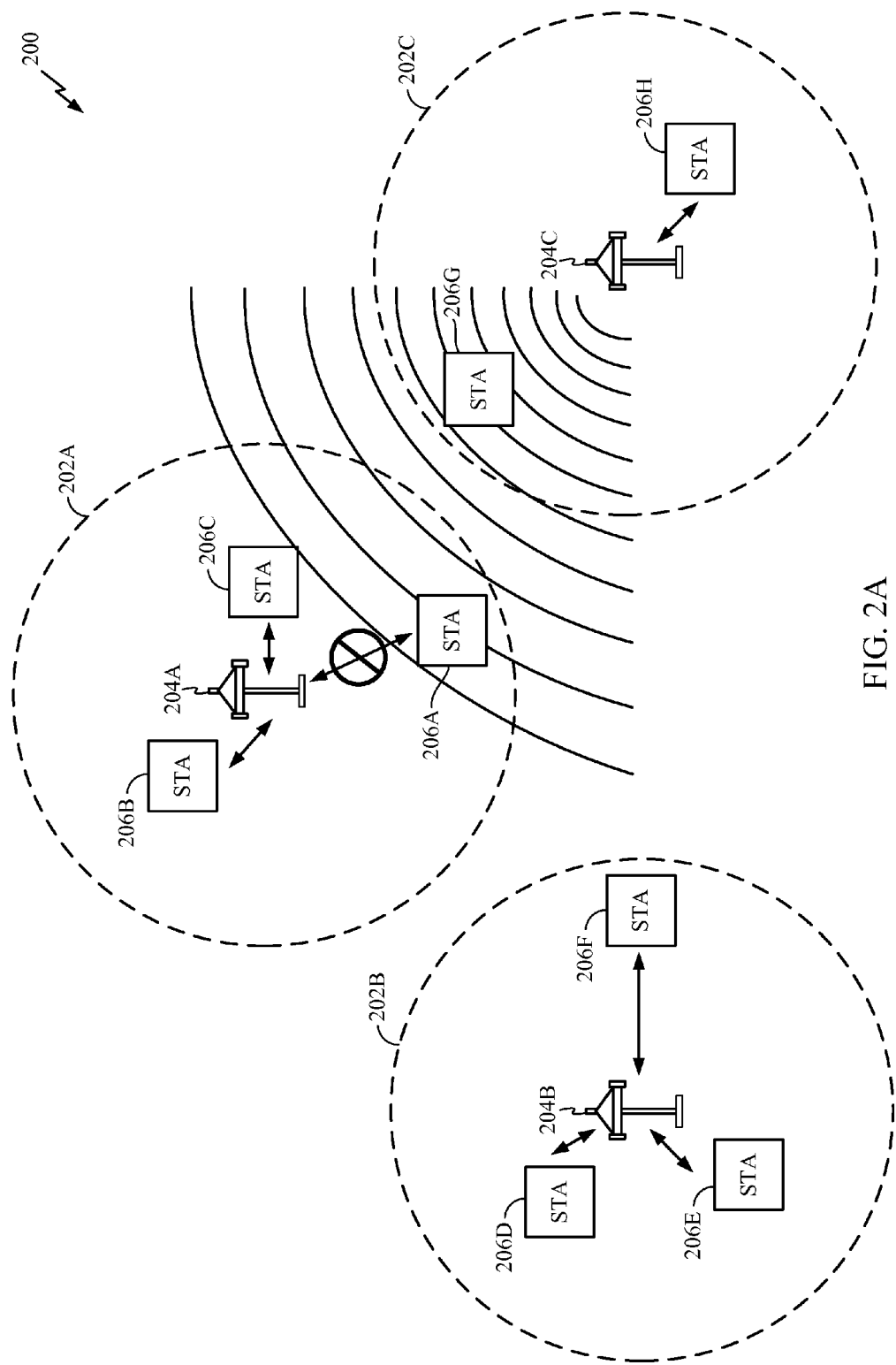
FIG. 2A shows a wireless communication system in which multiple wireless communication networks are present.

In some circumstances, a BSA may be located near other BSAs. For example, FIG. 2A shows a wireless communication system 200 in which multiple wireless communication networks are present. As illustrated in FIG. 2A, BSAs 202A, 202B, and 202C may be physically located near each other. Despite the close proximity of the BSAs 202A-C, the APs 204A-C and/or STAs 206A-H may each communicate using the same spectrum. Thus, if a device in the BSA 202C (e.g., the AP 204C) is transmitting data, devices outside the BSA 202C (e.g., APs 204A-B or STAs 206A-F) may sense the communication on the medium.

Generally, wireless networks that use a regular 802.11 protocol (e.g., 802.11a, 802.11b, 802.11g, 802.11n, etc.) operate under a carrier sense multiple access (CSMA) mechanism for medium access. According to CSMA, devices sense the medium and only transmit when the medium is sensed to be idle. Thus, if the APs 204A-C and/or STAs 206A-H are operating according to the CSMA mechanism and a device in the BSA 202C (e.g., the AP 204C) is transmitting data, then the APs 204A-B and/or STAs 206A-F outside of the BSA 202C may not transmit over the medium even though they are part of a different BSA.

FIG. 2A illustrates such a situation. As illustrated in FIG. 2A, AP 204C is transmitting over the medium. The transmission is sensed by STA 206G, which is in the same BSA 202C as the AP 204C, and by STA 206A, which is in a different BSA than the AP 204C. While the transmission may be addressed to the STA 206G and/or only STAs in the BSA 202C, STA 206A nonetheless may not be able to transmit or receive communications (e.g., to or from the AP 204A) until the AP 204C (and any other device) is no longer transmitting on the medium. Although not shown, the same may apply to STAs 206D-F in the BSA 202B and/or STAs 206B-C in the BSA 202A as well (e.g., if the transmission by the AP 204C is stronger such that the other STAs can sense the transmission on the medium).

The use of the CSMA mechanism then creates inefficiencies because some APs or STAs outside of a BSA may be able to transmit data without interfering with a transmission made by an AP or STA in the BSA. As the number of active wireless devices continues to grow, the inefficiencies may begin to significantly affect network latency and throughput. For example, significant network latency issues may appear in apartment buildings, in which each apartment unit may include an access point and associated stations. In fact, each apartment unit may include multiple access points, as a resident may own a wireless router, a video game console with wireless media center capabilities, a television with wireless media center capabilities, a cell phone that can act like a personal hot-spot, and/or the like. Correcting the inefficiencies of the CSMA mechanism may then be vital to avoid latency and throughput issues and overall user dissatisfaction.

Such latency and throughput issues may not even be confined to residential areas. For example, multiple access points may be located in airports, subway stations, and/or other densely-populated public spaces. Currently, WiFi access may be offered in these public spaces, but for a fee. If the inefficiencies created by the CSMA mechanism are not corrected, then operators of the wireless networks may lose customers as the fees and lower quality of service begin to outweigh any benefits.

Accordingly, the high-efficiency 802.11 protocol described herein may allow for devices to operate under a modified mechanism that minimizes these inefficiencies and increases network throughput. Such a mechanism is described below with respect to FIGS. 2B, 3, and 4.

Figure 2B:
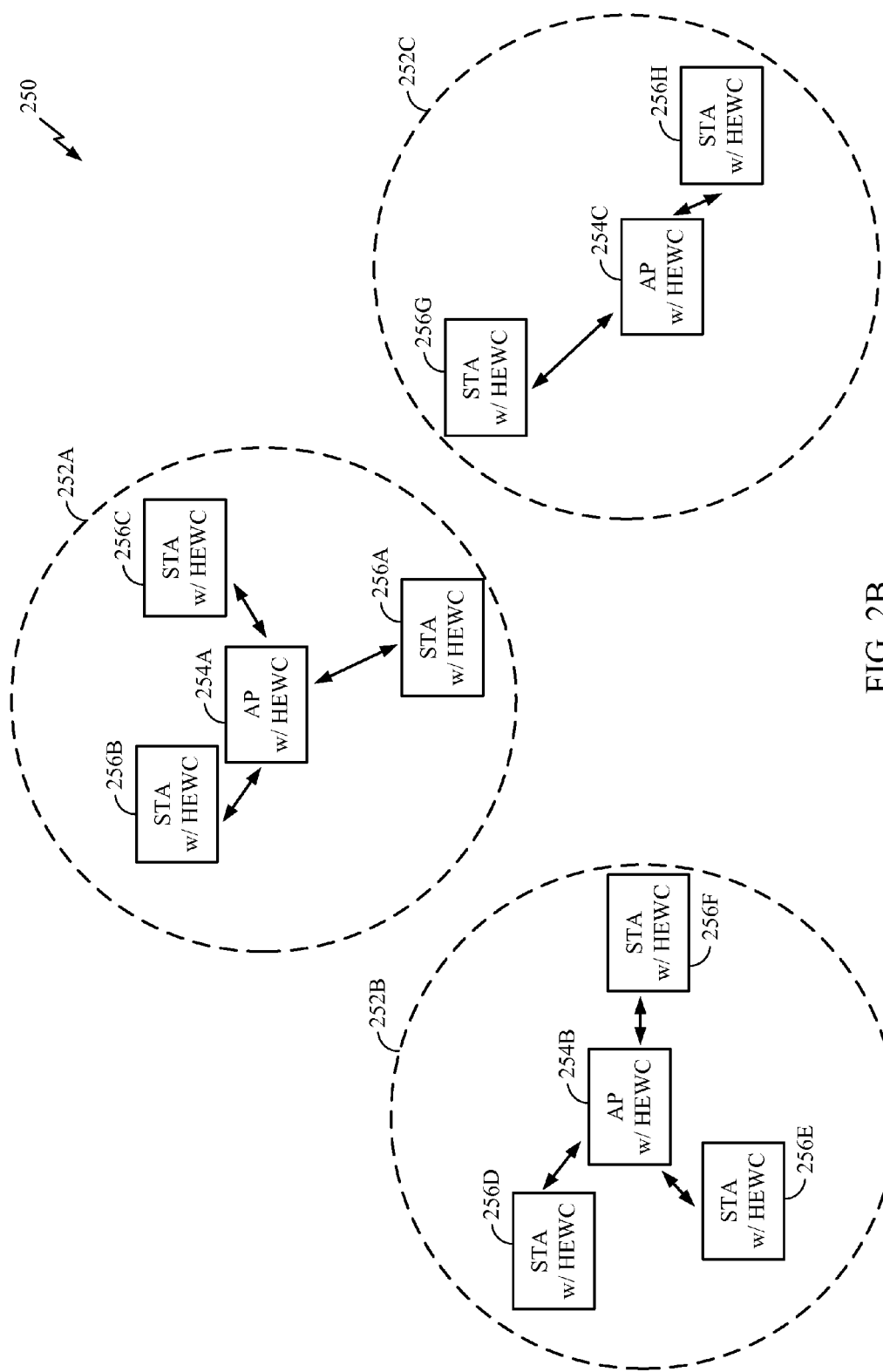
FIG. 2B shows another wireless communication system in which multiple wireless communication networks are present.

FIG. 2B shows a wireless communication system 250 in which multiple wireless communication networks are present. Unlike the wireless communication system 200 of FIG. 2A, the wireless communication system 250 may operate pursuant to the high-efficiency 802.11 standard discussed herein. The wireless communication system 250 may include an AP 254A, an AP 254B, and an AP 254C. The AP 254A may communicate with STAs 256A-C, the AP 254B may communicate with STAs 256D-F, and the AP 254C may communicate with STAs 256G-H.

A variety of processes and methods may be used for transmissions in the wireless communication system 250 between the APs 254A-C and the STAs 256A-H. For example, signals may be sent and received between the APs 254A-C and the STAs 256A-H in accordance with OFDM/OFDMA techniques or CDMA techniques.

The AP 254A may act as a base station and provide wireless communication coverage in a BSA 252A. The AP 254B may act as a base station and provide wireless communication coverage in a BSA 252B. The AP 254C may act as a base station and provide wireless communication coverage in a BSA 252C. It should be noted that each BSA 252A, 252B, and/or 252C may not have a central AP, but rather may allow for peer-to-peer communications between one or more of the STAs 256A-H. Accordingly, the functions of the AP 254A-C described herein may alternatively be performed by one or more of the STAs 256A-H.

In an embodiment, the APs 254A-C and/or STAs 256A-H include a high-efficiency wireless component. As described herein, the high-efficiency wireless component may enable communications between the APs and STAs using the high-efficiency 802.11 protocol. In particular, the high-efficiency wireless component may enable the APs 254A-C and/or STAs 256A-H to use a modified mechanism that minimizes the inefficiencies of the CSMA mechanism (e.g., enables concurrent communications over the medium in situations in which interference would not occur). The high-efficiency wireless component is described in greater detail below with respect to FIG. 4.

As illustrated in FIG. 2B, the BSAs 252A-C are physically located near each other. When, for example, AP 254A and STA 256B are communicating with each other, the communication may be sensed by other devices in BSAs 252B-C. However, the communication may only interfere with certain devices, such as STA 256F and/or STA 256G. Under CSMA, AP 254B would not be allowed to communicate with STA 256E even though such communication would not interfere with the communication between AP 254A and STA 256B. Thus, the high-efficiency 802.11 protocol operates under a modified mechanism that differentiates between devices that can communicate concurrently and devices that cannot communicate concurrently. Such classification of devices may be performed by the high-efficiency wireless component in the APs 254A-C and/or the STAs 256A-H.

In an embodiment, the determination of whether a device can communicate concurrently with other devices is based on a location of the device. For example, a STA that is located near an edge of the BSA may be in a state or condition such that the STA cannot communicate concurrently with other devices. As illustrated in FIG. 2B, STAs 206A, 206F, and 206G may be devices that are in a state or condition in which they cannot communicate concurrently with other devices. Likewise, a STA that is located near the center of the BSA may be in a station or condition such that the STA can communicate concurrently with other devices. As illustrated in FIG. 2, STAs 206B, 206C, 206D, 206E, and 206H may be devices that are in a state or condition in which they can communicate concurrently with other devices. Note that the classification of devices is not permanent. Devices may transition between being in a state or condition such that they can communicate concurrently and being in a state or condition such that they cannot communicate concurrently (e.g., devices may change states or conditions when in motion, when associating with a new AP, when disassociating, etc.).

Furthermore, devices may be configured to behave differently based on whether they are ones that are or are not in a state or condition to communicate concurrently with other devices. For example, devices that are in a state or condition such that they can communicate concurrently may communicate within the same spectrum. However, devices that are in a state or condition such that they cannot communicate concurrently may employ certain techniques, such as spatial multiplexing or frequency domain multiplexing, in order to communicate over the medium. The controlling of the behavior of the devices may be performed by the high-efficiency wireless component in the APs 254A-C and/or the STAs 256A-H.

In an embodiment, devices that are in a state or condition such that they cannot communicate concurrently use spatial multiplexing techniques to communicate over the medium. For example, power and/or other information may be embedded within the preamble of a packet transmitted by another device. A device in a state or condition such that the device cannot communicate concurrently may analyze the preamble when the packet is sensed on the medium and decide whether or not to transmit based on a set of rules.

Figure 3:
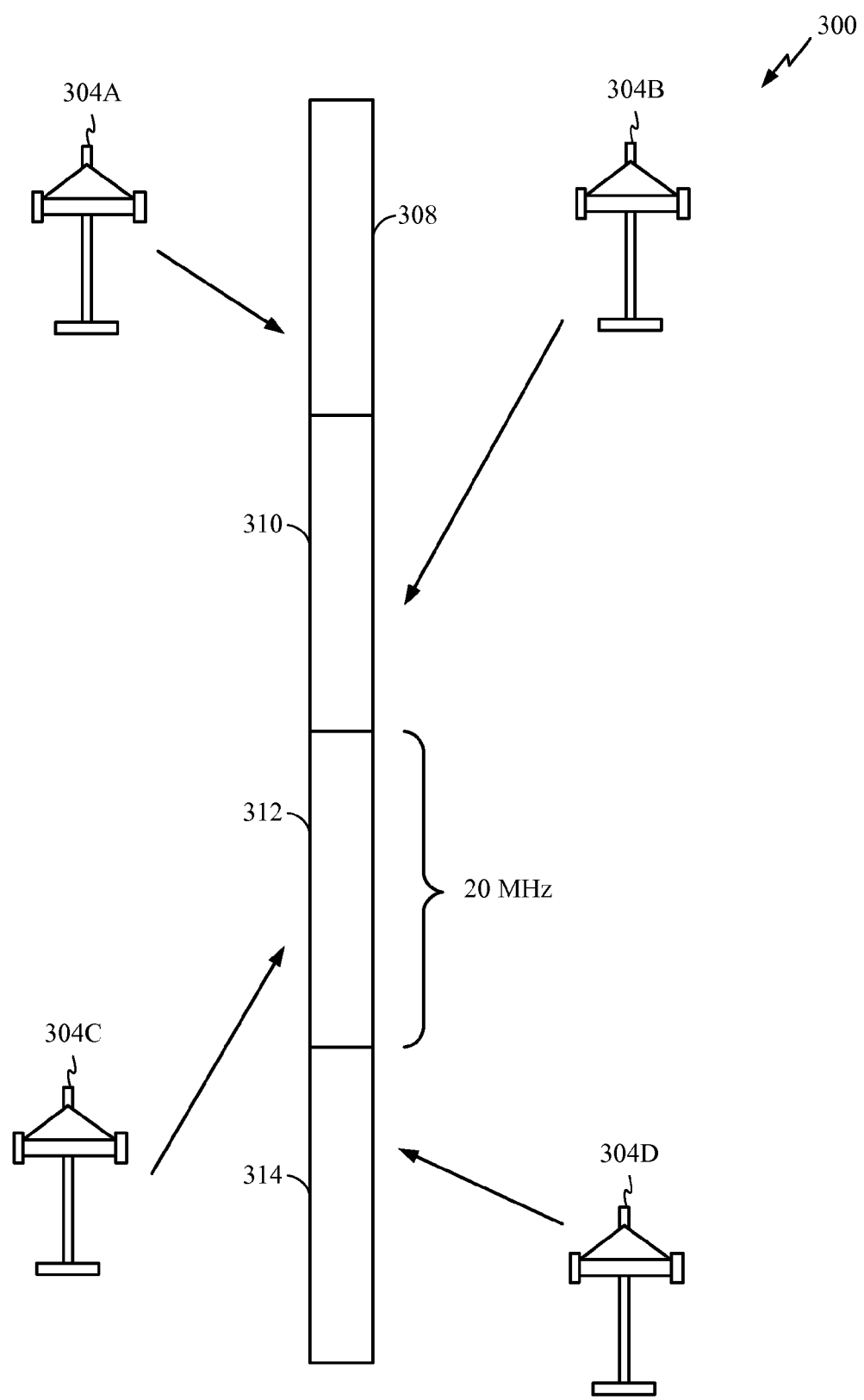
FIG. 3 shows frequency multiplexing techniques that may be employed within the wireless communication systems of FIGS. 1 and 2B.

In another embodiment, devices that are in a state or condition such that they cannot communicate concurrently use frequency domain multiplexing techniques to communicate over the medium. FIG. 3 shows frequency multiplexing techniques that may be employed within the wireless communication systems 100 of FIG. 1 and 250 of FIG. 2B. As illustrated in FIG. 3, an AP 304A, 304B, 304C, and 304D may be present within a wireless communication system 300. Each of the APs 304A, 304B, 304C, and 304D may be associated with a different BSA and include the high-efficiency wireless component described herein.

As an example, the bandwidth of the communication medium may be 80 MHz. Under the regular 802.11 protocol, each of the APs 304A, 304B, 304C, and 304D and the STAs associated with each respective AP attempt to communicate using the entire bandwidth, which can reduce throughput. However, under the high-efficiency 802.11 protocol using frequency domain multiplexing, the bandwidth may be divided into four 20 MHz segments 308, 310, 312, and 314

(e.g., channels), as illustrated in FIG. 3. The AP 304A may be associated with segment 308, the AP 304B may be associated with segment 310, the AP 304C may be associated with segment 312, and the AP 304D may be associated with segment 314.

In an embodiment, when the APs 304A-D and the STAs that are in a state or condition such that the STAs can communicate concurrently with other devices (e.g., STAs near the center of the BSA) are communicating with each other, then each AP 304A-D and each of these STAs may communicate using a portion of or the entire 80 MHz medium. However, when the APs 304A-D and the STAs that are in a state or condition such that the STAs cannot communicate concurrently with other devices (e.g., STAs near the edge of the BSA) are communicating with each other, then AP 304A and its STAs communicate using 20 MHz segment 308, AP 304B and its STAs communicate using 20 MHz segment 310, AP 304C and its STAs communicate using 20 MHz segment 312, and AP 304D and its STAs communicate using 20 MHz segment 314. Because the segments 308, 310, 312, and 314 are different portions of the communication medium, a first transmission using a first segment would not interference with a second transmission using a second segment.

Thus, APs and/or STAs, even those that are in a state or condition such that they cannot communicate concurrently with other devices when following 11 ac or older protocols, if they include the high-efficiency wireless component, they can communicate concurrently with other APs and STAs without interference. Accordingly, the throughput of the wireless communication system 300 may be increased. In the case of apartment buildings or densely-populated public spaces, APs and/or STAs that use the high-efficiency wireless component may experience reduced latency and increased network throughput even as the number of active wireless devices increases, thereby improving user experience.

Figure 4:
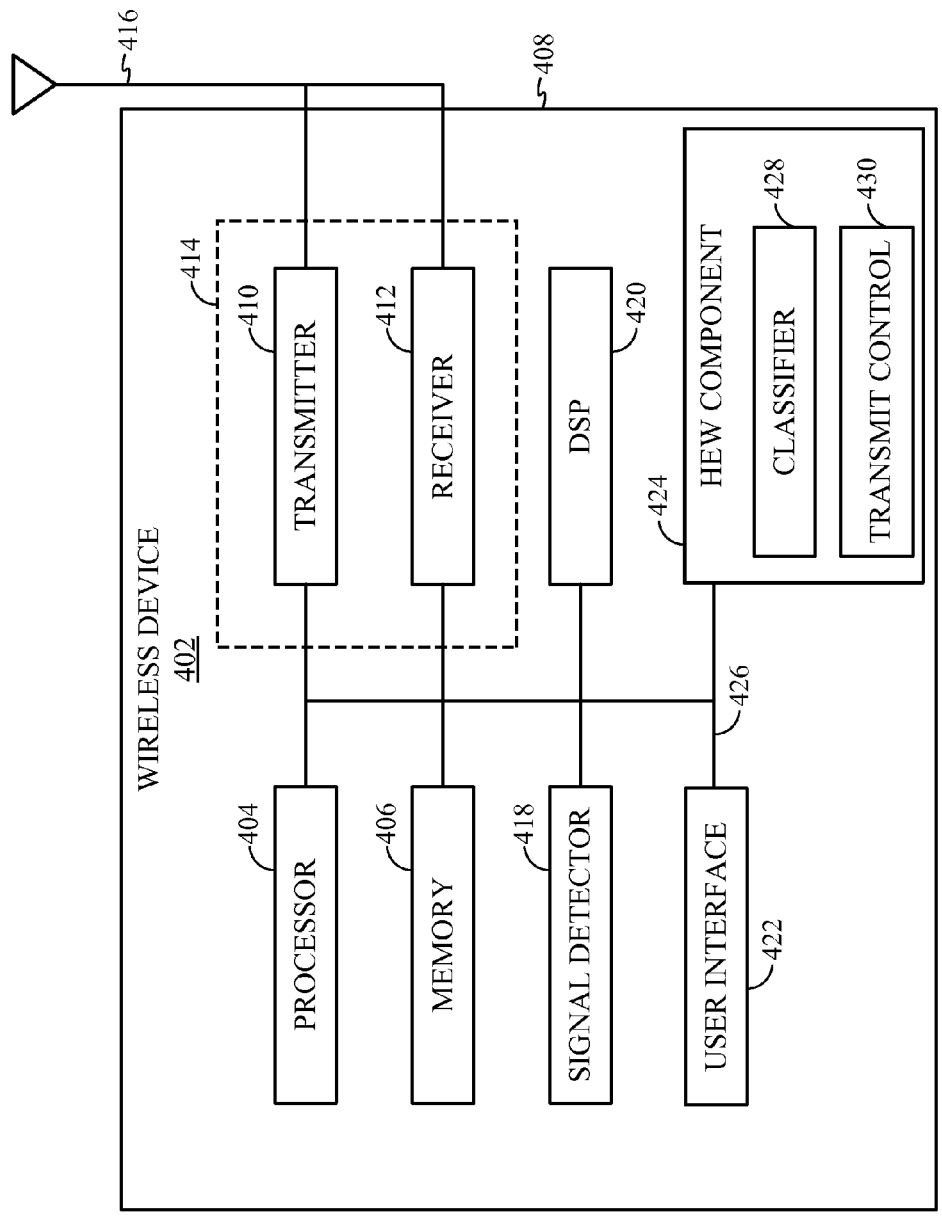
FIG. 4 shows a functional block diagram of an exemplary wireless device that may be employed within the wireless communication systems of FIGS. 1, 2B, and 3.

FIG. 4 shows an exemplary functional block diagram of a wireless device 402 that may be employed within the wireless communication systems 100, 250, and/or 300 of FIGS. 1, 2B, and 3. The wireless device 402 is an example of a device that may be configured to implement the various methods described herein. For example, the wireless device 402 may comprise the AP 104, one of the STAs 106, one of the APs 254, one of the STAs 256, and/or one of the APs 304.

The wireless device 402 may include a processor 404 which controls operation of the wireless device 402. The processor 404 may also be referred to as a central processing unit (CPU). Memory 406, which may include both read-only memory (ROM) and random access memory (RAM), may provide instructions and data to the processor 404. A portion of the memory 406 may also include non-volatile random access memory (NVRAM). The processor 404 typically performs logical and arithmetic operations based on program instructions stored within the memory 406. The instructions in the memory 406 may be executable to implement the methods described herein.

The processor 404 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 402 may also include a housing 408 that may include a transmitter 410 and/or a receiver 412 to allow transmission and reception of data between the wireless device 402 and a remote location. The transmitter 410 and receiver 412 may be combined into a transceiver 414. An antenna 416 may be attached to the housing 408 and electrically coupled to the transceiver 414. The wireless device 402 may also include (not shown) multiple transmitters, multiple receivers, multiple transceivers, and/or multiple antennas.

The wireless device 402 may also include a signal detector 418 that may be used in an effort to detect and quantify the level of signals received by the transceiver 414. The signal detector 418 may detect such signals as total energy, energy per subcarrier per symbol, power spectral density and other signals. The wireless device 402 may also include a digital signal processor (DSP) 420 for use in processing signals. The DSP 420 may be configured to generate a packet for transmission. In some aspects, the packet may comprise a physical layer data unit (PPDU).

The wireless device 402 may further comprise a user interface 422 in some aspects. The user interface 422 may comprise a keypad, a microphone, a speaker, and/or a display. The user interface 422 may include any element or component that conveys information to a user of the wireless device 402 and/or receives input from the user.

The wireless devices 402 may further comprise a high-efficiency wireless component 424 in some aspects. The high-efficiency wireless component 424 may include a classifier unit 428 and a transmit control unit 430. As described herein, the high-efficiency wireless component 424 may enable APs and/or STAs to use a modified mechanism that minimizes the inefficiencies of the CSMA mechanism (e.g., enables concurrent communications over the medium in situations in which interference would not occur).

The modified mechanism may be implemented by the classifier unit 428 and the transmit control unit 430. In an embodiment, the classifier unit 428 determines which devices are in a state or condition such that they can communicate concurrently with other devices and which devices are in a state or condition such that they cannot communicate concurrently with other devices without additional orthogonalization in time, frequency, or space. In an embodiment, the transmit control unit 430 controls the behavior of devices. For example, the transmit control unit 430 may allow certain devices to transmit concurrently on the same medium and allow other devices to transmit using a spatial multiplexing or frequency domain multiplexing technique. The transmit control unit 430 may control the behavior of devices based on the determinations made by the classifier unit 428.

The various components of the wireless device 402 may be coupled together by a bus system 426. The bus system 426 may include a data bus, for example, as well as a power bus, a control signal bus, and a status signal bus in addition to the data bus. Those of skill in the art will appreciate the components of the wireless device 402 may be coupled together or accept or provide inputs to each other using some other mechanism.

Although a number of separate components are illustrated in FIG. 4, those of skill in the art will recognize that one or more of the components may be combined or commonly implemented. For example, the processor 404 may be used to implement not only the functionality described above with respect to the processor 404, but also to implement the functionality described above with respect to the signal detector 418 and/or the DSP 420. Further, each of the components illustrated in FIG. 4 may be implemented using a plurality of separate elements.

Example APs/STAs Coordination

In some implementations, resources and operational modes of APs/STAs in networks with dense deployments of multiple BSSs are coordinated to reduce interference. In some aspects, one or more dimensions including time, frequency, space, and power are coordinated between APs/STAs. In some aspects, coordination messages are sent between APs/STAs. In some aspects, specific enhancements to 802.11ah scheduling and 802.11aa coordination protocol are employed.

Coordination can be achieved as explicit communication across devices (e.g., APs/STAs) of different BSSs. For example, via messages exchanged over the air or messages exchanged over a separate communication mean (e.g., cable backhaul connection). Messages can be exchanged directly between APs, between APs via STAs, directly between STAs, or between STAs via AP.

Coordination can be achieved as implicit communications/measurements based on observation of the traffic on the medium. For example, packets may be enhanced to carry partial information that can help the coordination Coordination final decisions can be made by a central informed controller, at each AP, with a distributed heuristic, or at each STA, based on exchanged info.

Figure 5:
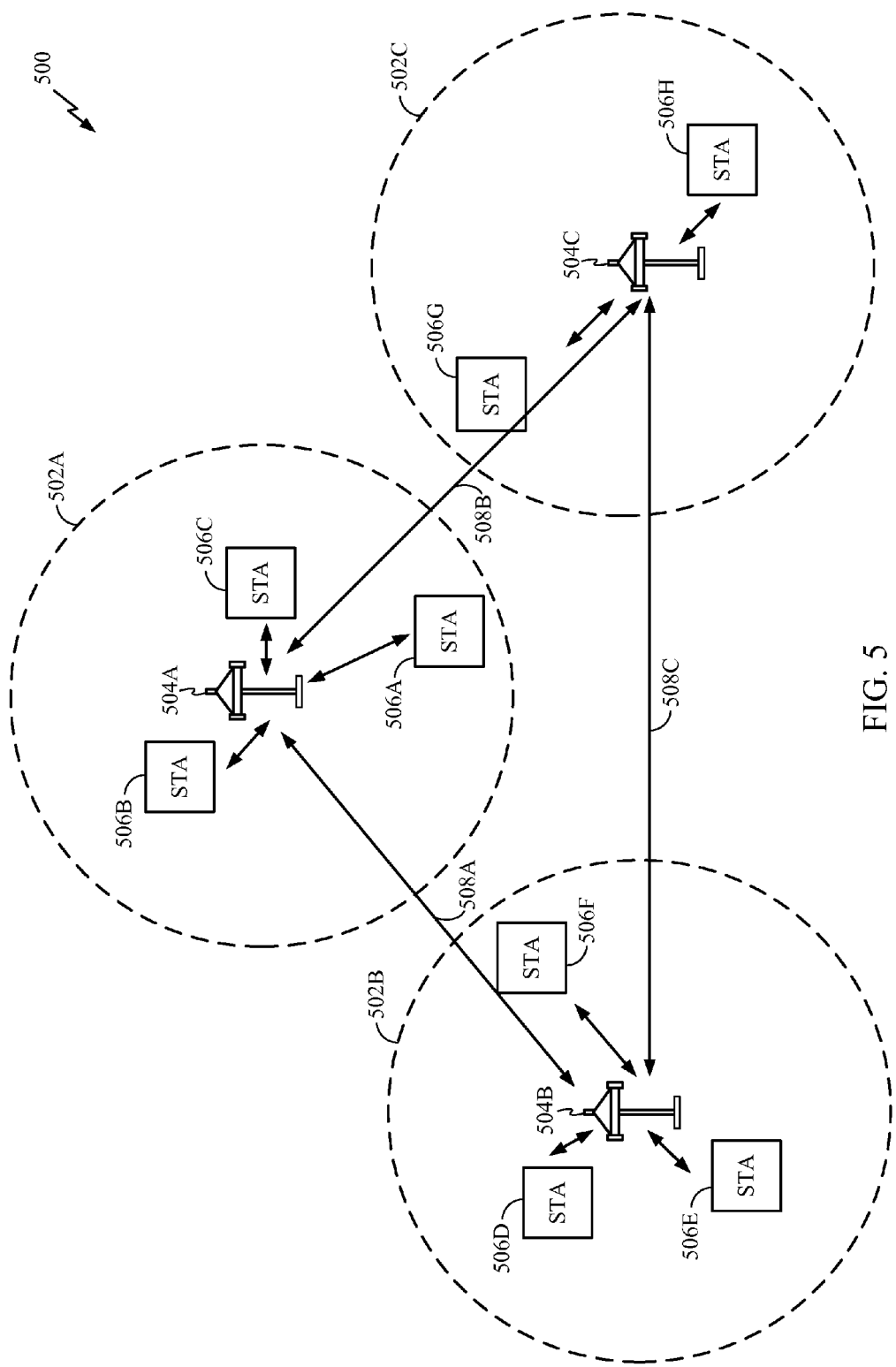
FIG. 5 shows a wireless communication system in which aspects of the present disclosure may be employed.

FIG. 5 shows examples of coordinated transmissions that may be employed within the wireless communication systems 100 of FIG. 1 and 250 of FIG. 2B. FIG. 5 illustrates three access points 504A-C. Each access point 504A-C manages a corresponding BSS 502A-C. Each access point 504A-C is in communication with a plurality of stations 506. For example, access point 504A is in communication with stations 506A-C, while access point 504C is in communication with stations 506G-H.

In some aspects, the physical location of a station relative to other stations, its associated access point, and/or other access points may make the station more or less subject to interference. For example, because stations 506D-E are positioned relatively close to their access point 504B and relatively far from other BSS's 502A and 502C, and access points and stations communicating within those BSS's, stations 506D-E may be less susceptible to interference when either of those BSS's communicate. Similarly, STA 506H may be less susceptible to interference from transmissions generated by either BSS 502A or 502B. Because these devices may not be susceptible to interference, some of the devices may communicate concurrently with other devices, even if a traditional carrier sense media access mechanism would prevent such concurrent transmission. For example, STA 506H may communicate with access point 504C concurrently with access point 504B communicating with stations 506D or 506E.

Other stations may be more susceptible to interference, for example, stations positioned relatively further from their access points and/or relatively closer to wireless devices of other BSSs may be more susceptible to interference.

The wireless device 402 may comprise an AP 104, a STA 106, an AP 254, a STA 256, and/or an AP 304, and may be used to transmit and/or receive communications. That is, either AP 104, STA 106, AP 254, STA 256, or AP 304 may serve as transmitter or receiver devices. Certain aspects contemplate signal detector 418 being used by software running on memory 406 and processor 404 to detect the presence of a transmitter or receiver.

In a dense BSS scenario as illustrated in FIG. 5, significant throughput gains can be achieved if BSSs coordinate their access to the airwaves or medium in one or more of time, frequency, space, and power. In some implementations, APs 504A, 504B, and 504C coordinate the use of resources and operational modes of the shared medium to reduce the likelihood that wireless devices 402 are subject to interference. A wireless device 402 can be subject to interference by either causing interference with another wireless device 402 or experiencing interference caused by another wireless device 402.

In other implementations, one of the APs 504A, 504B, and 504C receives instructions from another one of the APs 504A, 504B, and 504C to modify its use or one of the wireless devices 402 associated with the receiving AP use of the airwaves or medium to reduce the likelihood that a wireless device 402 is subject to interference. In certain embodiments, the APs 504A, 504B, and 504C exchange information to coordinate their use of the shared medium. In other embodiments the AP 504A, 504B, and 504C receives an instruction from another AP 504A, 504B, and 504C on how it should use the shared medium.

For example, the APs 504A, 504B, and 504C can coordinate access to the shared medium even when the APs are associated with different BSS 502A, 502B, and 502C. The APs 504A, 504B, and 504C can determine whether one or more wireless devices 402 is subject to interference with another wireless device in the wireless network. The APs 504A, 504B, and 504C identify the one or more wireless devices 402 that are subject to interference via identifying information such as a MAC address. The APs 504A, 504B, and 504C then receive information from each other on the nature of the interference and/or the shared medium. The APs 504A, 504B, and 504C then modify the use of the shared medium by one or more of the wireless devices 402 to reduce the likelihood that the wireless device is subject to interference. In some implementations, this modification includes transmission of one or more messages 508A, 508B, and 508C between APs as illustrated in FIG. 5.

In other embodiments, the AP 504A, 504B, and 504C receives an instruction from another AP 504A, 504B, and 504C on how it should use the shared medium. For example, the AP 504A, 504B, and 504C can receive information associated with the first or second BSSs. The information can include an identification of one or more wireless devices that are subject to interference. The receiving AP 504A, 504B, and 504C then modifies, based on the received information, the use of the shared medium to reduce the likelihood that the one or more wireless devices are subject to interference. The modification can be to resources including, but not limited to, time, frequency, and space. The modification can be to operation modes including, but not limited to, transmission parameters and access modes.

Example Staggered Primary Channel Selection for Wi-Fi

In a network with multiple interfering access points (APs) operating in a same band (e.g., such as the dense basic service set (BSS) scenario as illustrated in the wireless communication system 500 in FIG. 5), it may be beneficial to set the primary channels of interfering APs (e.g., such as the APs 504 illustrated in FIG. 5) to be on different channels. Operating interfering APs on the same primary channel typically involves time division multiplexing (TDM) of the medium via the carrier sense multiple access (CSMA) procedure. Operating interfering APs on different primary channels—even if within the same operating bandwidth—typically involves frequency division multiplexing (FDM) of the medium via the dynamic bandwidth transmission procedure. In certain systems (e.g., IEEE 802.11ac systems), APs transmissions can be sent on less than the operating bandwidth to low throughput users (e.g., 20 MHz or 40 MHz).

Currently, the standard (e.g., the IEEE 802.11 standard) suggests that primary channels be chosen such that they do not overlap an overlapping basic service set's (OBSS) secondary 20 MHz channel (or secondary 40 MHz channel). Techniques are provided herein for staggered primary channels.

Typically, an AP may change the operating channel through the Channel Switch Announcement protocol (e.g., as defined in IEEE 802.11n/ac). The Channel Switch Announcement protocol may include the use of a Channel Switch Announcement element, a Secondary Channel Offset element, and a Wide Bandwidth (WideBW) Channel Switch element. The WideBW channel switch element may be included (e.g., required) in the Channel Switch Announcement protocol if the selected primary channel bandwidth exceeds 40 MHz. The WideBW Channel Switch element may contain an element ID, length, and information about the selected primary channel such as channel width and frequency segment. However, if the AP is changing the primary channel, information about the new channel width and frequency may not be necessary because changing the primary channel does not change the channel width or the channel frequency. Thus, when changing the primary channel, the WideBW Channel Switch element may not be sent, even when the new bandwidth exceeds than 40 MHz.

Example Channel Switch Indication

According to certain aspects, an optimized signaling may be defined which may be used to indicate a change in the primary channel number. According to certain aspects, the optimized signaling may follow the conventional Channel Switch Announcement Protocol, as described above, except that the Channel Switch Announcement Protocol may be modified such that the WideBW element may not be sent, even when the total bandwidth exceeds 40 MHz. According to certain aspects, the optimized signaling may include signaling an information element that includes at least one or more of a channel number of the primary channel after the switch and an amount of time until the switching time. According to certain aspects, the amount of time until switching may be measured by a counter (e.g., in units of a number of beacon intervals). According to certain aspects, the information element may be included in one or more beacons transmitted before switching primary channels and may not be included in the beacons after switching primary channels.

Example Primary Channel Selection

An AP may select a primary channel based on information at the AP. For example, the AP may select a primary channel based on the received signal strength indication (RSSI) of neighbor APs (e.g., OBSSs). Additionally or alternatively, the AP may select a primary channel based on which primary channels are used by the neighbor APs. According to certain aspects, the AP may also use additional information provided (e.g., advertised) by neighbor APs to select a primary channel. This additional information may include, without limitation, information about the loading of a neighbor AP and potential interference that may be caused by a neighbor AP (e.g., if the neighbor AP is close, but has little traffic, the neighbor AP may cause relatively little interference). The additional information provided by the neighbor APs may be useful to the AP when selecting the primary channel. According to certain aspects, the additional information may also include information about neighbor APs channel allocations. For example, without limitation, the additional information may include information about the primary channel of the neighbor AP, the neighbor AP's suggestion of primary channels for other APs, and primary channels that are forbidden to other APs by the neighbor AP. According to certain aspects, the additional information may also include load information. For example, the additional information may include loading parameters, the number of stations connected to the neighbor AP using a particular channel, the ratio of air time usage for the stations and for the AP, information about dropped or failed packets (e.g., the ratio of dropped packets), time used to transmit on a given bandwidth, loading information on channels used by neighbor APs, the operating bandwidth of the neighbor AP or of its connected STAs, or other loading information as appropriate.

According to certain aspects, the AP may also determine the primary channel by choosing the channel that sees the least number of transmissions on OBSSs. The AP may take measurements of the amount of transmissions seen itself or the AP may request its STAs to take the measurements and report the measurement results to the AP. The AP may request that the STAs not send any data during a period while STAs perform the measurements so there is no BSS traffic to create confusion during the measurements. The AP may also refrain from transmitting during this measurement period. According to certain aspects, the AP may use a restricted access window (RAW), a quiet element, or a CTS to self to silence the BSS traffic during the measurement period.

According to certain aspects, when deciding on which primary channel to use, the AP may also take into account the bandwidth the AP expects to be able to send its transmissions on when the AP is able to access the medium. The AP may determine the bandwidth be determined by measuring the amount of transmissions it sees on its secondary channels. For example, the AP can measure how many 40 MHz transmissions it sees on its secondary 40 Mhz channel and how many 20 MHz transmissions it sees on its secondary 20 Mhz channel. These transmissions may be referred to as "secondary channel transmissions". If the AP is deciding between two primary channels that see the same number of OBSS transmissions, the AP may the primary channel that sees the least number of "secondary channel transmissions,"

since this may allow the AP to access more bandwidth when it accesses the medium. According to certain aspects, either the AP or the STAs may perform these secondary channel measurements. If the STAs perform the measurement, the STAs may report the measurement results to the AP.

According to certain aspects, the additional information shared between neighbor APs to aid in the selection of a primary channel may be exchanged in a variety of manners. In one example implementation, the additional information may be included in an information element sent in an AP beacon. Since, an AP listens to beacons whenever the AP joins a network, the AP may be able to receive the additional information after it joins the network. In another example implementation, the additional information may be sent by the neighbor APs over a backhaul when an AP joins a network. Thus, the sharing of the additional information by the neighbor APs may not use any air time. In yet another example implementation, the additional information may be communicated by the neighbor APs via action frames. For example, the AP may send unicast messages to certain APs requesting the additional information be sent. As another example, broadcast messages may be sent, in which case neighbor APs may then include the shared information in their beacon. This may avoid having multiple APs reply at the same time. In yet another example implementation, the AP may transmit action frames to a station, requesting the receiving station to retransmit the frame.

Example AP Primary Channel Coordination

A primary channel may be selected in various manners. According to certain aspects, the AP may set its primary channel without negotiating with other APs (e.g., using information at the AP or additional information received from neighbor APs as described above). According to certain aspects, the AP may coordinate its primary channel selection with neighbor APs. For example, the AP may select a primary channel based on an explicit agreement (e.g., negotiation) with the neighbor APs. In an example implementation, after collecting the additional information from the neighbor APs (e.g., as described in the sections above), the AP may advertise the intended channel switch to neighbor APs (e.g., via over-the-air (OTA) or backhaul transmission). The neighbor APs receiving the advertisement of the AP's intended channel switch may then indicate whether the proposed switch is acceptable or not acceptable. For example, a neighbor APs may indicate that the intended channel switch is acceptable by either transmitting an explicit response (e.g., indicating "no objection") or by not responding to the advertisement (e.g., implicitly indicating the proposed response is acceptable). A neighbor AP may indicate that the intended channel switch is not acceptable by transmitting an explicit response (e.g., indicating "objection) and may include an alternative suggestions.

According to certain aspects, the selection of a primary channel may be performed by a centralized controller. In an example implementation, a centralized controller may collect all of the additional information received by all connected APs. For example, the centralized controller may collect the additional information via a backhaul connection. Based on at least the received information, the central controller may make primary channel assignments for the connected APs.

Figure 6:
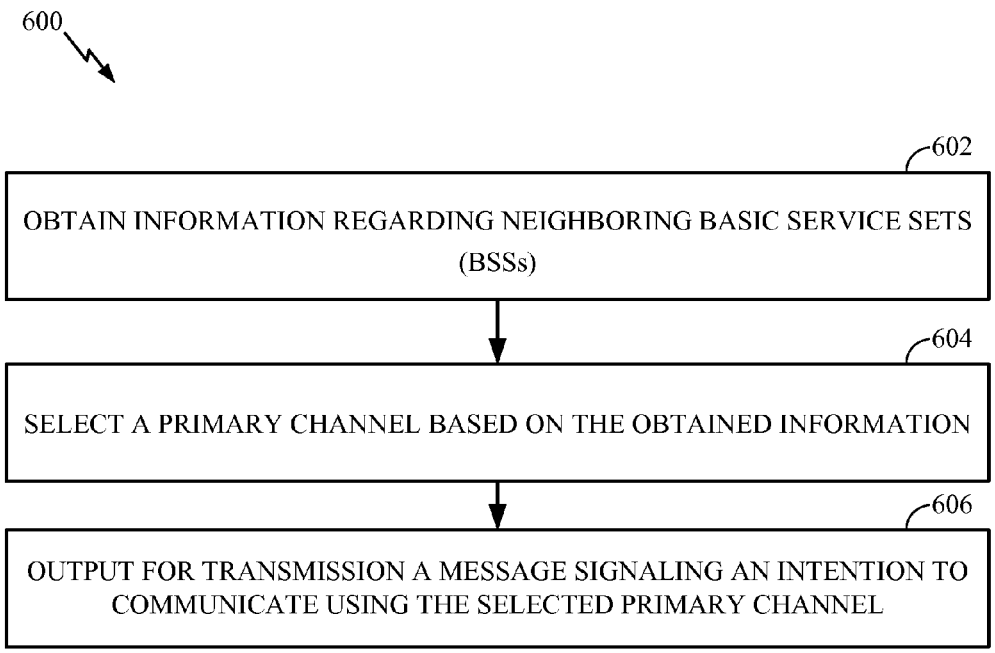
FIG. 6 illustrates example operations for wireless communications, by an access point (AP), in accordance with certain aspects of the present disclosure.

FIG. 6 illustrates example operations 600 for wireless communications, in accordance with certain aspects of the present disclosure. The example operations 600 may be performed, for example, by an AP (e.g., AP 504 illustrated in FIG. 5). The operations 600 may begin, at 602, by obtaining information regarding neighbor basic service sets (BSSs). According to certain aspects, the selected primary channel overlaps with a secondary channel used by at least one device (e.g, AP/STA) of the neighbor BSSs. According to certain aspects, the selected primary channel may be selected to minimize overlap with primary channels of devices of the neighbor BSSs. According to certain aspects, the information regarding neighbor BSSs may include RSSI of devices of the neighbor BSSs, primary channel indications of apparatuses of the neighbor BSSs, loading (e.g., a number of devices in the BSSs using a channel, air time used on a channel, packets dropped) on a channel, or how often transmission occurs using a given bandwidth on channels used by at least one device of the neighbor BSSs, potential interference caused by an device of the neighbor BSSs, primary channels suggested to other BSSs by the neighbor BSSs, and/or primary channels forbidden to other BSSs by the neighbor BSSs. According to certain aspects, the information regarding neighbor BSSs may be obtained via at least one of a beacon, a backhaul connection, an action frame, broadcast transmission, or action frames transmitted from devices of the neighbor BSSs.

At 604, the AP may select a primary channel based on the obtained information.

At 606, the AP may output for transmission a message signaling an intention to communicate using the selected primary channel. According to certain aspects, the signaling may not indicate an operating channel width of the selected channel and also may not indicate an operating channel frequency of the selected bandwidth. According to certain aspects, the signaling may indicate a channel number of the selected primary channel and/or an amount of time until the intended switch to the selected primary channel. According to certain aspects, the signaling may include one or more beacons transmitted before the intended switch to the selected primary channel.

According to certain aspects, the AP may also transmit information used for primary channel selection (e.g., to one or more devices of the neighbor BSSs). According to certain aspects, the AP may receive responses from the one or more devices of the neighbor BSSs regarding the selected primary channel. According to certain aspects, each response may indicate the selected primary channel is acceptable to the devices sending the response or the selected primary channel is not acceptable to the device sending the response. According to certain aspects, the responses may indicate a suggested alternative primary channel.

Figure 6A:
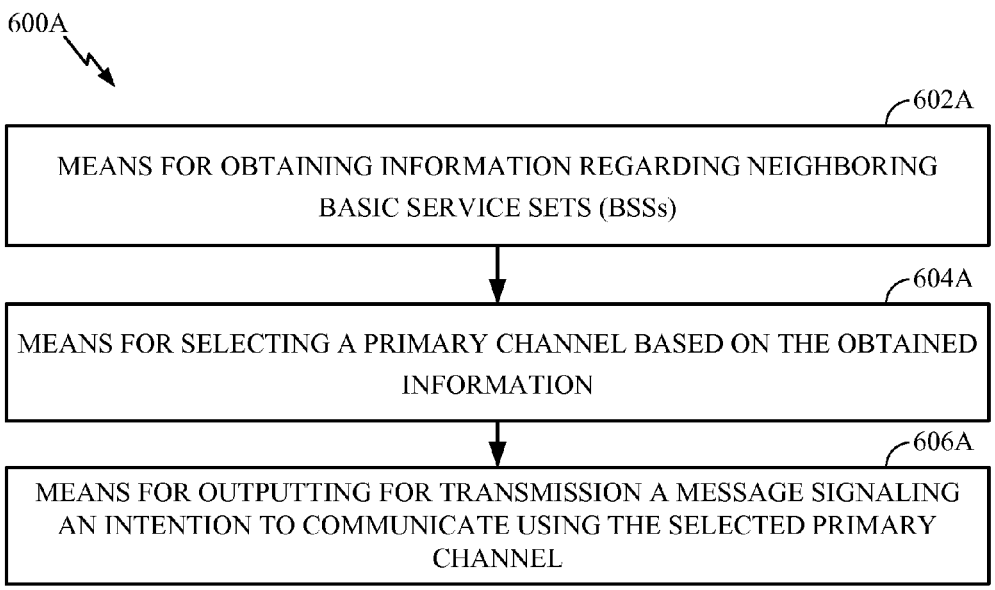
FIG. 6A illustrates example components capable of performing the operations shown in FIG. 6, in accordance with certain aspects of the present disclosure.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 600 illustrated in FIG. 6 correspond to means 600A illustrated in FIG. 6A.

For example, means for transmitting may comprise a transmitter (e.g., the transmitter 410) and/or an antenna(s) 416 of the wireless device 402 illustrated in FIG. 4. Means for receiving may comprise a receiver (e.g., the receiver 412) and/or an antenna(s) 416 of the wireless device 402 illustrated in FIG. 4.

Means for obtaining and means for selecting may include one or more processors, such as the processor 404 illustrated in FIG. 4. According to certain aspects, such means may be implemented by processing systems configured to perform the corresponding functions by implementing various algorithms (e.g., in hardware or by executing software instructions). For example, an algorithm for selecting a primary channel may take, as input, information obtained regarding neighbor BSSs, and select a primary channel based on this input. The selected primary channel may then be indicated via a message and provided to the transmitting means for transmission.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers. Thus, in some aspects, computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For example, instructions for obtaining information regarding neighbor BSSs, instructions for selecting a primary channel based on the obtained information, and instructions for outputting for transmission a message signaling an intention to communicate using the selected primary channel. For certain aspects, the computer program product may include packaging material.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. An apparatus for wireless communications, comprising:
    at least one processor configured to:
        select a primary channel for communicating with one or more wireless devices based on information regarding neighbor basic service sets (BSSs), wherein the selection of the primary channel comprises determining which of the one or more wireless devices can communicate concurrently with other wireless devices of the one or more wireless devices and which of the one or more wireless devices cannot communicate concurrently with other wireless devices of the one or more wireless devices; and
        generate a message signaling that the apparatus intends to communicate with the one or more wireless devices using the selected primary channel, wherein the message comprises an indication of a channel number of the selected primary channel and an amount of time until the intended communication using the selected primary channel;
    a first interface configured to output the message for transmission; and
    a second interface configured to receive responses from one or more wireless devices of the neighbor BSSs, wherein each response indicates the selected primary channel is acceptable to the wireless device sending the response or the selected primary channel is not acceptable to the wireless device sending the response, and wherein:
    the at least one processor is further configured to select a different primary channel based on the responses.

2. The apparatus of claim 1, wherein the selected primary channel overlaps with a secondary channel used by at least one of the neighbor BSSs.

3. The apparatus of claim 1, the selected primary channel is selected to minimize overlap with primary channels of the neighbor BSSs.

4. The apparatus of claim 1, wherein the information regarding the neighbor BSSs comprises at least one of: receive signal strength indications (RSSI) from the neighbor BSSs or primary channel indications from the neighbor BSSs.

5. The apparatus of claim 1, wherein the information regarding the neighbor BSSs comprises information regarding at least one of: loading on channels used by the neighbor BSSs or potential interference caused by the neighbor BSSs.

6. The apparatus of claim 5, wherein the information regarding loading comprises an indication of least one of: a number of wireless devices in the neighbor BSSs using a channel, air time used on a channel, packets dropped on a channel, or how often transmission occurs on a particular bandwidth.

7. The apparatus of claim 1, wherein the information regarding the neighbor BSSs comprises information regarding at least one of: primary channels suggested to other BSSs by the neighbor BSSs or primary channels forbidden to other BSSs by the neighbor BSSs.

8. The apparatus of claim 1, wherein the at least one processor is further configured to obtain information regarding the neighbor BSSs via at least one of a beacon, a backhaul connection, an action frame, or a management frame.

9. The apparatus of claim 1, wherein the at least one processor is further configured to obtain information regarding the neighbor BSSs via broadcast transmission.

10. The apparatus of claim 1, wherein the at least one processor is further configured to obtain information regarding the neighbor BSSs via action frames transmitted from the neighbor BSSs.

11. The apparatus of claim 1, wherein the at least one processor is further configured to obtain information regarding the neighbor BSSs via management frames transmitted from a BSS of which the apparatus is a member.

12. The apparatus of claim 1, wherein:
    the at least one processor is further configured to generate another message signaling information used for primary channel selection; and
    the first interface is further configured to output the other message for transmission.

13. The apparatus of claim 1, wherein the first interface is configured to output the message for transmission to the neighbor BSSs.

14. The apparatus of claim 1, wherein:
    at least one of the received responses indicates a suggested alternative primary channel; and
    the at least one processor is further configured to select the suggested alternative primary channel as the primary channel.

15. An apparatus for wireless communications, comprising:
    at least one processor configured to:
        select a primary channel for communicating with one or more wireless devices based on information regarding neighbor basic service sets (BSSs), wherein the selection of the primary channel comprises determining which of the one or more wireless devices can communicate concurrently with other wireless devices of the one or more wireless devices and which of the one or more wireless devices cannot communicate concurrently with other wireless devices of the one or more wireless devices; and
        generate a message signaling that the apparatus intends to communicate with the one or more wireless devices using the selected primary channel;
    a first interface configured to output the message for transmission via one or more beacons transmitted before the intended communication using the selected primary channel;
    a second interface configured to receive responses from one or more wireless devices of the neighbor BSSs, wherein each response indicates the selected primary channel is acceptable to the wireless device sending the response or the selected primary channel is not acceptable to the wireless device sending the response, and wherein:
    the at least one processor is further configured to select a different primary channel based on the responses.

16. A method for wireless communications, comprising:
    obtaining information regarding neighbor basic service sets (BSSs);
    selecting a primary channel for communicating with one or more wireless devices based on the obtained information, wherein selecting the primary channel comprises determining which of the one or more wireless devices can communicate concurrently with other wireless devices of the one or more wireless devices and which of the one or more wireless devices cannot communicate concurrently with other wireless devices of the one or more wireless devices;

outputting for transmission a message signaling an intention to communicate with the one or more wireless devices using the selected primary channel, wherein the message comprises an indication of a channel number of the selected primary channel and an amount of time until the intended communication using the selected primary channel;

receiving responses from one or more wireless devices of the neighbor BSSs, wherein each response indicates the selected primary channel is acceptable to the wireless device sending the response or the selected primary channel is not acceptable to the wireless device sending the response; and selecting a different primary channel based on the responses.

17. The method of claim 16, wherein the selected primary channel overlaps with a secondary channel used by at least one of the neighbor BSSs.

18. The method of claim 16, wherein the selected primary channel is selected to minimize overlap with primary channels of the neighbor BSSs.

19. The method of claim 16, wherein the outputting comprises outputting the message for transmission via one or more beacons transmitted before the intended communication using the selected primary channel.

20. The method of claim 16, wherein the information regarding the neighbor BSSs comprises at least one of: receive signal strength indications (RSSI) from the neighbor BSSs or primary channel indications from the neighbor BSSs.

21. The method of claim 16, wherein the information regarding the neighbor BSSs comprises information regarding at least one of: loading on channels used by the neighbor BSSs or potential interference caused by the neighbor BSSs.

22. The method of claim 21, wherein the information regarding loading comprises an indication of least one of: a number of wireless devices in the neighbor BSSs using a channel, air time used on a channel, packets dropped on a channel, or how often transmission occurs on a particular bandwidth.

23. The method of claim 16, wherein the information regarding the neighbor BSSs comprises information regarding at least one of: primary channels suggested to other BSSs by the neighbor BSSs or primary channels forbidden to other BSSs by the neighbor BSSs.

24. The method of claim 16, wherein obtaining the information regarding the neighbor BSSs comprises obtaining the information via at least one of a beacon, a backhaul connection, an action frame, a broadcast transmission, or a management frame.

25. An access point, comprising:
at least one antenna;
at least one processor configured to:
select a primary channel for communicating with one or more wireless devices based on information regarding neighbor basic service sets (BSSs), wherein the selection of the primary channel comprises determining which of the one or more wireless devices can communicate concurrently with other wireless devices of the one or more wireless devices and which of the one or more wireless devices cannot communicate concurrently with other wireless devices of the one or more wireless devices; and
generate a message signaling that the apparatus intends to communicate with the one or more wireless devices using the selected primary channel, wherein the message comprises an indication of a channel number of the selected primary channel and an amount of time until the intended communication using the selected primary channel;
a transmitter configured to transmit the message via the at least one antenna; and
a receiver configured to receive responses from one or more wireless devices of the neighbor BSSs, wherein each response indicates the selected primary channel is acceptable to the wireless device sending the response or the selected primary channel is not acceptable to the wireless device sending the response, and wherein:
the at least one processor is further configured to select a different primary channel based on the responses.

* * * * *